United States Patent
Takeda et al.

(10) Patent No.: US 6,204,314 B1
(45) Date of Patent: Mar. 20, 2001

(54) FILM RETARDANT POLYAMIDE RESIN COMPOSITION

(75) Inventors: Tadashi Takeda; Toshihiro Arai; Osamu Hamazoe; Hiroshi Kirikoshi, all of Kawasaki (JP)

(73) Assignee: EC-Showa Denko K.K., Tokyo (JP)

( * ) Notice: Subject to any disclaimer, the term of this patent is extended or adjusted under 35 U.S.C. 154(b) by 0 days.

(21) Appl. No.: 09/326,670

(22) Filed: Jun. 7, 1999

Related U.S. Application Data
(60) Provisional application No. 60/118,780, filed on Feb. 5, 1999.

(30) Foreign Application Priority Data

| | | |
|---|---|---|
| Jun. 8, 1998 | (JP) | 10-159186 |
| Jul. 15, 1998 | (JP) | 10-200284 |

(51) Int. Cl.⁷ .............................. C08K 5/34; C08K 3/22
(52) U.S. Cl. ........................................ 524/101; 524/538
(58) Field of Search ..................... 524/101, 538

(56) References Cited

U.S. PATENT DOCUMENTS

| | | | |
|---|---|---|---|
| 5,206,310 | * | 4/1993 | Yasue et al. ........................ 525/432 |
| 5,482,985 | * | 1/1996 | Baierweck et al. ................... 524/101 |
| 5,789,529 | * | 8/1998 | Matsumura et al. .................. 528/310 |

FOREIGN PATENT DOCUMENTS

| | | | |
|---|---|---|---|
| 2695395 | * | 5/1992 | (FR) . |
| 53-31759 | | 3/1978 | (JP) ............................. C08L/77/00 |
| 7-3152 | | 1/1995 | (JP) ............................. C08L/77/00 |
| 7-310011 | | 11/1995 | (JP) ............................. C08L/77/00 |

\* cited by examiner

*Primary Examiner*—Ana Woodward
(74) *Attorney, Agent, or Firm*—Sughrue, Mion, Zinn Macpeak & Seas, PLLC

(57) ABSTRACT

The object is to provide a flame retardant polyamide resin composition having excellent tensile elongation at break and excellent properties for use as a hinge. A flame retardant polyamide resin composition is provided, which comprises 100 parts by weight of a polyamide resin mixture consisting of a first aliphatic polyamide and at least one polyamide selected from the group consisting of a second aliphatic polyamide, which differs from the first aliphatic polyamide, and a semi-aromatic polyamide, and from 0.4 to 20 parts by weight of a melamine cyanurate-type flame retarder.

7 Claims, No Drawings

FILM RETARDANT POLYAMIDE RESIN COMPOSITION

CROSS-REFERENCE TO RELATED APPLICATIONS

This application claims the benefit of U.S. Provisional Application No. 60/118780, filed Feb. 5, 1999.

BACKGROUND OF THE INVENTION

1. Field of the Invention

The present invention relates to a flame retardant polyamide resin composition having a high tensile elongation at break and excellent properties for use as a hinge.

This application is based on patent applications Nos. Hei 10-200284 and Hei 10-159186, both filed in Japan, and provisional application No. 60/118780 filed in U.S., the contents of which are incorporated herein by reference.

2. Description of Related Art

Polyamide resin is being widely used because of its excellent thermal properties, mechanical properties, electric properties and chemical properties. As the use of plastic materials is diversified in recent years, the polyamide resin is also required to have flame resistance.

In order to impart flame resistance to the polyamide resin, a method of using melamine cyanurate (see, JP-A-53-031759 (the term "JP-A" as used herein means an "unexamined published Japanese patent application")) and a method of using melamine cyanurate and magnesium hydroxide in combination (see, JP-A-7-003152, JP-A-7-310011) have heretofore been proposed.

However, these methods have a problem in that the molded article obtained is low in the tensile elongation at break. Accordingly, for example, in the case of a molded article with a hinge, the hinge performance is inferior. Thus, these conventional methods cannot be applied thereto and are disadvantageously limited in the use thereof.

BRIEF SUMMARY OF THE INVENTION

The present invention has been made under these circumstances and the object of the present invention is to provide a flame retardant polyamide resin composition having excellent tensile elongation at break and excellent properties for use as a hinge.

The present inventors have found that the above-described object can be attained by using a specific polyamide resin mixture. The present invention has been accomplished based on this finding.

Accordingly, the present invention provides a flame retardant polyamide resin composition comprising 100 parts by weight of a polyamide resin mixture consisting of a first aliphatic polyamide and at least one polyamide selected from the group consisting of a second aliphatic polyamide, which differs from the first aliphatic polyamide, and a semi-aromatic polyamide, and from 0.4 to 20 parts by weight of a melamine cyanurate-type flame retarder.

The flame retardant polyamide resin composition of the present invention has excellent tensile elongation at break and good flame resistance, accordingly, is suitable particularly for molded articles having a hinge part and also useful over a wide range in the field of automobile industry parts such as cable protector and wire harness, OA device parts and home appliances.

DETAILED DESCRIPTION OF THE INVENTION

In general, a polyamide is a chain polymer compound having acid amide bonds (—CONH—) in the repeated units. Polyamides can be classified according to polymerization methods as (1) polyamides produced by the ring-opening polymerization of a lactam, (2) polyamides produced by the polycondensation of an amino carboxylic acid, or (3) polyamides produced by the polycondensation of a diamine and a dibasic acid. These polyamides can be further classified according to the structures of the principal chains as aliphatic polyamides, semi-aromatic polyamides, and aromatic polyamides.

Specific examples of aliphatic polyamides which can be used in the present invention are polyamide 6, polyamide 11, polyamide 12, polyamide 66, polyamide 610, polyamide 612, polyamide 46, polyamide 66-6, and polyamide 6-610, among which polyamide 66, polyamide 66-6, and polyamide 6 are particularly preferable.

The polyamide 66 for use in the present invention is a polyamide resin obtained by the polycondensation of hexamethylenediamine and adipic acid, the polyamide 6 is a polyamide resin obtained by the ring opening polymerization of $\epsilon$-caprolactam, and the polyamide 66-6 is a polyamide resin obtained by the copolymerization of hexamethylenediamine, adipic acid and $\epsilon$-caprolactam.

The semi-aromatic polyamide which can be used in the present invention is a polyamide in which one of the dicarboxylic acid and the diamine is aliphatic, and the other is aromatic. Examples of the aromatic dicarboxylic acid are terephthalic acid (T) and isophthalic acid (I). An example of the aromatic diamine is m-xylylenediamine (MXD). Examples of the semi-aromatic polyamide are polyamide 6T, polyamide MXD6, polyamide 6I, and polyamide 6I/6T. The polyamide 6T is a polyamide resin which can be obtained by the polycondensation of hexamethylenediamine and terephthalic acid (T). The polyamide MXD6 is a polyamide resin which can be obtained by the polycondensation of m-xylylenediamine (MXD) and adipic acid. The polyamide 6I is a polyamide resin which can be obtained by the polycondensation of hexamethylenediamine and isophthalic acid (I). The polyamide 6I/6T is a polyamide resin which can be obtained by the polycondensation of hexamethylenediamine, isophthalic acid (I), and terephthalic acid (T).

These polyamide resins usually have a relative viscosity (determined by a sulfuric acid method according to JIS K6810) of preferably 2.5 or more. The polyamide resins are not limited on the kind of the terminal group and the ratio thereof.

Examples of the melamine cyanurate-type flame retarder include melamine cyanurate and melamine cyanurate derivatives where some of the hydroxyl groups and amino groups of the melamine cyanurate are displaced by other substituents. Specific examples thereof include melamine cyanurate, mono($\beta$-cyanoethyl)isocyanurate, bis($\beta$-cyanoethyl)isocyanurate and tris($\beta$-cyanoethyl)isocyanurate.

The melamine cyanurate is an equimolar reaction product of melamine and cyanuric acid and can be obtained, for example, by mixing an aqueous cyanuric acid solution and an aqueous melamine acid solution and filtering the precipitate produced. Other derivatives can also be obtained by a method similar thereto. The shape thereof is preferably fine powder having an average particle size of 100 $\mu$m or less.

The ratio of the melamine cyanurate-type flame retarder blended is from 0.4 to 20 parts by weight, preferably from 0.6 to 10 parts by weight, more preferably from 1 to 5 parts by weight, per 100 parts by weight of the polyamide resin mixture. If the ratio of the melamine cyanurate-type flame retarder blended is less than 0.4 parts by weight, the flame retardant effect is not sufficiently high, whereas even if it exceeds 20 parts by weight, no more increase in the effect can be attained.

The polyamide resin composition of the present invention can be obtained by mixing the above-described polyamide resin mixture and the melamine cyanurate-type flame retarder. The mixing order is not particularly limited and the melamine cyanurate-type flame retarder may be mixed after previously mixing the polyamide resins or respective components may be mixed simultaneously. The mixing method is also not particularly limited and a method commonly used in the field of synthetic resin may be used. Specific examples thereof include a method of dry-blending the components using a mixing machine such as Henschel mixer, a tumbler or a ribbon blender, and then kneading the mixed components in the melted state in a kneading machine such as a screw system extruder.

The polyamide resin composition obtained preferably has a tensile elongation at break of 100% or more in view of the hinge property.

In the production of the polyamide resin composition of the present invention, a stabilizer against oxygen, heat, light or ultraviolet ray, a lubricant, an antistatic agent, a reinforcing agent, a coloring agent (e.g., pigment) and other additives may also be blended within the range of not impairing the performance of the polyamide resin composition.

A first embodiment of the present invention is a flame retardant polyamide resin composition comprising 100 parts by weight of a polyamide resin mixture consisting of from 20 to 85 wt % of polyamide 66 and from 15 to 80 wt % of at least one polyamide selected from polyamide 6 and polyamide 66-6, and from 0.4 to 20 parts by weight of a melamine cyanurate-type flame retarder.

The polyamide resin mixture for use in the first embodiment of the present invention consists of from 20 to 85 wt % of polyamide 66 and from 15 to 80 wt % of at least one polyamide selected from polyamide 6 and polyamide 66-6.

The component ratio of polyamide 66 in the resin mixture is preferably from 30 to 80 wt %, more preferably from 50 to 75 wt %. If the polyamide 66 component ratio is less than 20 wt %, unsatisfactory flame resistance results, whereas if it exceeds 85 wt %, the tensile elongation at break disadvantageously decreases.

A second embodiment of the present invention is a flame retardant polyamide resin composition comprising 100 parts by weight of a polyamide resin mixture consisting of an aliphatic polyamide and a semi-aromatic polyamide, and from 0.4 to 20 parts by weight of a melamine cyanurate-type flame retarder.

The polyamide resin mixture for use in the second embodiment of the present invention consists of the above-described aliphatic polyamide and semi-aromatic polyamide. The component ratio of the semi-aromatic polyamide in the resin mixture is generally from 3 to 50 wt %, preferably from 5 to 40 wt %, and more preferably from 10 to 30 wt %.

EXAMPLES

The present invention is described in greater detail below by referring to Examples.

The aliphatic polyamide resins used were polyamide 66 having a relative viscosity of 2.6, polyamide 66-6 having a relative viscosity of 2.6, and polyamide 6 having a relative viscosity of 2.6. The semi-aromatic polyamide resin used was polyamide 6I/6T (the ratio of 6I/6T: 7/3) having a relative viscosity of 2.7.

The test methods are described below.
(1) Flame Resistance Test

A test piece having a length of 100 mm, a width of 6 mm and a thickness of 1 mm was prepared and measured under the condition of oxygen concentration being 24 vol % according to JIS K7201. The evaluation was performed as follows.

◯: The test piece was extinguished within 4 seconds.

X: The test piece continued burning in excess of 4 seconds.

(2) Tensile Elongation at Break

An ASTM No. 1 dumbbell subjected to equilibrium water absorption at a temperature of 23° C. and a humidity of 50% RH was measured according to ASTM D638.

(3) Hinge Performance

A test piece in the form of a strip having a thickness of 2 mm and having a hinge portion (thickness: 0.25 mm; length: 2 mm) in the middle was left at an ambient temperature of −10° C. for an hour, and then bent manually once to 180°. The evaluation was performed as follows.

◯: The hinge portion did not cracked.

Δ: The hinge portion cracked.

X: The hinge portion cracked and was severed.

Examples 1 to 4 and Comparative Examples 1 and 2

Polyamide resins and melamine cyanurate, of which kind and blending amount are shown in Table 1, were previously mixed in a tumbler, then supplied to a 30-mm co-rotating twin-screw extruder (PCM30, manufactured by Ikegai Iron Works, Ltd.), and melt-kneaded to produce a composition. The composition obtained was molded using an injection molding machine (manufactured by Sumitomo Juki KK) to prepare various test pieces. Each test piece was measured for tensile elongation at break, hinge performance, and flame resistance. The results obtained are shown in Table 1.

TABLE 1

| | Polyamide 66 parts by weight | Polyamide 66-6 parts by weight | Polyamide 6 parts by weight | Polyamide 6I/6T parts by weight | Melamine cyanurate parts by weight | Tensile elongation at break % | Hinge performance −109° C. | Flame resistance |
|---|---|---|---|---|---|---|---|---|
| Example | | | | | | | | |
| 1 | 75 | 0 | 25 | 0 | 2 | 110 | ◯ | ◯ |
| 2 | 50 | 0 | 50 | 0 | 2 | 130 | ◯ | ◯ |
| 3 | 75 | 25 | 0 | 0 | 2 | 100 | ◯ | ◯ |
| 4 | 50 | 50 | 0 | 0 | 2 | 120 | ◯ | ◯ |
| 5 | 75 | 0 | 0 | 25 | 2 | 120 | ◯ | ◯ |

TABLE 1-continued

|  | Polyamide 66 parts by weight | Polyamide 66-6 parts by weight | Polyamide 6 parts by weight | Polyamide 6I/6T parts by weight | Melamine cyanurate parts by weight | Tensile elongation at break % | Hinge performance −109° C. | Flame resistance |
| --- | --- | --- | --- | --- | --- | --- | --- | --- |
| 6 | 50 | 0 | 25 | 25 | 2 | 140 | ○ | ○ |
| 7 | 0 | 0 | 75 | 25 | 2 | 160 | ○ | ○ |
| Comparative Example | | | | | | | | |
| 1 | 100 | 0 | 0 | 0 | 2 | 20 | X | ○ |
| 2 | 0 | 0 | 100 | 0 | 2 | 25 | Δ | X |

What is claimed is:

1. A flame retardant polyamide resin composition consisting essentially of:
   100 parts by weight of a polyamide resin mixture consisting of a first aliphatic polyamide and at least one polyamide selected from the group consisting of (1) a second aliphatic polyamide, which differs from the first aliphatic polyamide, and (2) a semi-aromatic polyamide, and
   from 0.4 to 20 parts by weight of a melamine cyanurates flame retarder.

2. The flame retardant polyamide resin composition as claimed in claim 1, wherein the polyamide resin mixture consists of from 20 to 85 wt % of polyamide 66 and from 15 to 80 wt % of at least one polyamide selected from polyamide 6 and polyamide 66-6.

3. The flame retardant polyamide resin composition as claimed in claim 1, wherein the polyamide resin mixture consists of an aliphatic polyamide and a semi-aromatic polyamide.

4. The flame retardant polyamide resin composition as claimed in claim 3, wherein the proportion of the semi-aromatic polyamide to the polyamide resin mixture is from 3 to 50 wt %.

5. The flame retardant polyamide resin composition as claimed in claim 3, wherein the aliphatic polyamide is at least one of polyamide 66, polyamide 66-6, and polyamide 6.

6. The flame retardant polyamide resin composition as claimed in claim 1, which has a tensile elongation at break of 100% or more.

7. A flame retardant polyamide resin composition consisting essentially of:
   100 parts by weight of a polyamide resin mixture consisting of a first aliphatic polyamide and at least one polyamide selected from the group consisting of a (1) second aliphatic polyamide, which differs from the first aliphatic polyamide, and (2) a semi-aromatic polyamide,
   from 0.4 to 20 parts by weight of a melamine cyanurate flame retarder, and
   a stabilizer.

* * * * *